(12) United States Patent
Luo (10) Patent No.: US 12,253,752 B2
(45) Date of Patent: Mar. 18, 2025

(54) DISPLAY PANELS, METHODS OF MANUFACTURING THE SAME, AND ELECTRONIC DEVICES

(71) Applicant: JRD COMMUNICATION (SHENZHEN) LTD., Shenzhen (CN)

(72) Inventor: Guangyue Luo, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 18/236,968

(22) Filed: Aug. 23, 2023

(65) Prior Publication Data

US 2024/0012282 A1    Jan. 11, 2024

Related U.S. Application Data

(63) Continuation of application No. PCT/CN2021/083355, filed on Mar. 26, 2021.

(30) Foreign Application Priority Data

Feb. 24, 2021 (CN) .......................... 202110209762.2

(51) Int. Cl.
*G02F 1/1335* (2006.01)
*G02F 1/1339* (2006.01)
*G02F 1/1362* (2006.01)

(52) U.S. Cl.
CPC ...... *G02F 1/133514* (2013.01); *G02F 1/1339* (2013.01); *G02F 1/136209* (2013.01)

(58) Field of Classification Search
CPC ............ G02F 1/133514; G02F 1/1339; G02F 1/136209; G02F 1/13312; G02F 1/133606; G02F 1/1333
See application file for complete search history.

(56) References Cited

U.S. PATENT DOCUMENTS

| 2005/0110922 A1 | 5/2005 | Lee et al. |
| 2007/0229737 A1 | 10/2007 | Takeda |
| 2009/0237775 A1* | 9/2009 | Ito .................... G02F 1/16757 359/296 |
| 2009/0296032 A1* | 12/2009 | Tago .................... G02F 1/1337 349/123 |

(Continued)

FOREIGN PATENT DOCUMENTS

| CN | 101246285 A | 8/2008 |
| CN | 103336631 A | 10/2013 |

(Continued)

OTHER PUBLICATIONS

PCT International Search Report for International Application No. PCT/CN2021/083355, mailed on Oct. 29, 2021, 8pp.

(Continued)

*Primary Examiner* — Kevin Quarterman
(74) *Attorney, Agent, or Firm* — The Roy Gross Law Firm, LLC; Roy Gross (57) ABSTRACT

The present application discloses a display panel, a method of manufacturing the same, and an electronic device. The display panel includes an array substrate, a light blocking matrix, and a backlight module, wherein the array substrate, the light blocking matrix, and the backlight module are stacked in sequence, and the light blocking matrix includes light shielding columns in a grid-like arrangement.

12 Claims, 6 Drawing Sheets

(56) References Cited

U.S. PATENT DOCUMENTS

| | | | | |
|---|---|---|---|---|
| 2015/0062457 | A1* | 3/2015 | Kida | G06F 3/0446 |
| | | | | 349/12 |
| 2015/0153596 | A1* | 6/2015 | Senokuchi | H05B 33/10 |
| | | | | 445/25 |
| 2020/0348561 | A1* | 11/2020 | Oka | G02F 1/136209 |
| 2022/0026771 | A1* | 1/2022 | Yan | G02B 6/0088 |
| 2022/0321747 | A1* | 10/2022 | Hou | H04N 23/55 |

FOREIGN PATENT DOCUMENTS

| | | |
|---|---|---|
| CN | 103591514 A | 2/2014 |
| CN | 104280925 A | 1/2015 |
| CN | 104698669 A | 6/2015 |
| CN | 104808410 A | 7/2015 |
| CN | 105487284 A | 4/2016 |
| CN | 105676554 A | 6/2016 |
| CN | 106526942 A | 3/2017 |
| CN | 106647013 A | 5/2017 |
| CN | 107219674 A | 9/2017 |
| CN | 107390428 A | 11/2017 |
| CN | 209044246 U | 6/2019 |
| CN | 111341804 A | 6/2020 |
| CN | 111708205 A | 9/2020 |
| CN | 112068348 A | 12/2020 |

OTHER PUBLICATIONS

PCT Written Opinion of the International Searching Authority for International Application No. PCT/CN2021/083355, mailed on Oct. 29, 2021, 8pp.

Chinese Office Action issued in corresponding Chinese Patent Application No. 202110209762.2 dated Jan. 30, 2022, pp. 1-9, 18pp.

* cited by examiner

DISPLAY PANELS, METHODS OF MANUFACTURING THE SAME, AND ELECTRONIC DEVICES

The present application is a continuation of International Application No. PCT/CN2021/083355 filed on Mar. 26, 2021, which claims priority to Chinese Patent Application No. 202110209762.2, filed to the Chinese Patent Office on Feb. 24, 2021, entitled "DISPLAY PANELS, METHODS OF MANUFACTURING THE SAME, AND ELECTRONIC DEVICES", which is incorporated herein by reference in its entirety.

TECHNICAL FIELD

Embodiments of the present application relate to display technologies, and more particularly, to display panels, methods for manufacturing the display panel, and electronic devices.

BACKGROUND

With the update of display technology, more diversified and personalized display terminals are expected, and a full screen gradually becomes one of the important development trends of the display terminals. Many mobile phone manufacturers design to place a camera module is below the screen to realize the full screen in the real sense.

SUMMARY

An embodiment of the present application provides a display panel including an array substrate, a light blocking matrix, and a backlight module, the array substrate, the light blocking matrix, and the backlight module are stacked in sequence, and the light blocking matrix includes light shielding columns in a grid-like arrangement.

In a display panel, the array substrate includes at least a pixel matrix, the pixel matrix includes a plurality of pixel units, a first spacing region is provided between adjacent ones of the plurality of pixel units and between adjacent sub-pixels in each of the plurality of pixel units, pixel isolation walls are provided in the first spacing region, and the pixel isolation walls are located at positions corresponding to that of the light blocking columns, respectively.

In a display panel, a width of the light blocking column is same as that of the pixel isolation wall.

In a display panel, the display panel further includes a color filter substrate, and the color filter substrate, the array substrate, the light blocking matrix, and the backlight module are laminated in sequence;
the color filter substrate includes at least a light-filtering matrix including a plurality of light-filtering units, a second spacing region is provided between adjacent ones of the plurality of light-filtering units and between adjacent sub-light-filtering units in each of the plurality of light-filtering units, light-filtering isolation columns are provided in the second spacing region, and the light-filtering isolation columns are located at positions corresponding to that of the light blocking columns.

In a display panel, the light-filtering isolation column, the pixel isolation wall, and the light blocking column have the same width.

In a display panel, the array substrate and the backlight module are fixedly connected through a frame sealant, and a height of the light blocking matrix is lesser than or equal to that of the frame sealant.

In a display panel, the light blocking matrix is a black light blocking matrix.

The present application also provides a method of manufacturing a display panel, and the method comprises:
providing an array substrate, where the array substrate includes at least a pixel matrix and pixel isolation walls, the pixel matrix includes a plurality of pixel units, a first spacing region is provided between adjacent ones of the plurality of pixel units and between adjacent sub-pixels in each of the plurality of pixel units, and the pixel isolation walls are provided in the first spacing region, and include an opaque material;
forming a photoresist layer on a side of the array substrate away from the pixel isolation wall; and
performing an exposure process on a side of the array substrate close to the pixel isolation wall, and performing a development process to form the light blocking matrix.

In a method of manufacturing the display panel, the method further includes: after forming the photoresist layer on the side of the array substrate away from the pixel isolation wall, performing a soft baking process to remove a solvent from the photoresist layer.

In a method of manufacturing the display panel, the forming of the photoresist layer includes: coating photoresist onto the side of the array substrate away from the pixel isolation wall to form the photoresist layer, and the photoresist is positive photoresist.

In a method of manufacturing the display panel, the coating of the photoresist includes coating the photoresist by spin coating or blade coating.

In a method of manufacturing the display panel, the method further includes:
providing the array substrate, where the array substrate includes at least the pixel matrix and the pixel isolation walls, the pixel matrix includes the plurality of pixel units, the first spacing region is provided between adjacent ones of the plurality of pixel units and between adjacent sub-pixels in each of the plurality of pixel units, and the pixel isolation walls are provided in the first spacing region, and include the opaque material;
providing a color filter substrate, where the color filter substrate includes at least a light-filtering matrix including a plurality of light-filtering units, a second spacing region is provided between adjacent ones of the plurality of light-filtering units and between adjacent sub-light-filtering units in each of the plurality of light-filtering units, light-filtering isolation columns are provided in the second spacing region, and include an opaque material; the color filter substrate, the pixel isolation wall, and the array substrate are stacked in sequence;
forming the photoresist layer on the side of the array substrate away from the pixel isolation wall; and
performing the exposure process on a side of the color filter substrate away from the pixel isolation wall, and performing the development process to form the light blocking matrix.

In a method of manufacturing the display panel, the method further includes:
forming a frame sealant on the array substrate by coating, dripping liquid crystal on the color filter substrate to form a liquid crystal layer, forming an alignment film on each of the array substrate and the color filter substrate by coating;

aligning the array substrate and the color film substrate and connecting the array substrate and the color film substrate through the frame sealant by a cell process, to form an LCD cell.

The present application further provides an electronic device including a display panel, a camera module, and a circuit board, the camera module is disposed below the display panel, and both the display panel and the camera module are electrically connected to the circuit board; and the display panel includes an array substrate, a light blocking matrix, and a backlight module, the array substrate, the light blocking matrix, and the backlight module are stacked in sequence, and the light blocking matrix includes light shielding columns arranged in a grid-like arrangement.

In an electronic device, the array substrate includes at least a pixel matrix, the pixel matrix includes a plurality of pixel units, a first spacing region is provided between adjacent ones of the plurality of pixel units and between adjacent sub-pixels in each of the plurality of pixel units, pixel isolation walls are provided in the first spacing region, and the pixel isolation walls are located at positions corresponding to that of the light blocking columns, respectively.

In an electronic device, a width of the light blocking column is same as that of the pixel isolation wall.

In an electronic device, the electronic device further includes a color filter substrate, and the color filter substrate, the array substrate, the light blocking matrix, and the backlight module are laminated in sequence;

The color filter substrate includes at least a light-filtering matrix including a plurality of light-filtering units, a second spacing region is provided between adjacent ones of the plurality of light-filtering units and between adjacent sub-light-filtering units in each of the plurality of light-filtering units, light-filtering isolation columns are provided in the second spacing region, and the light-filtering isolation columns are located at positions corresponding to that of the light blocking columns.

In an electronic device, the light-filtering isolation column, the pixel isolation wall, and the light blocking column have the same width.

In an electronic device, the array substrate and the backlight module are fixedly connected through a frame sealant, and a height of the light blocking matrix is lesser than or equal to that of the frame sealant.

In an electronic device, the light blocking matrix is a black light blocking matrix.

DETAILED DESCRIPTION

In the description of the present application, it should be understood that orientations or position relationships indicated by the terms "width," "thickness," "up," "down," "front," "back," or the like are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present application. Technical solutions in embodiments of the present application will be clearly and completely described below with reference to the accompanying drawings. It will be apparent that the described embodiments are only a part of the embodiments of the present application, and not all embodiments. Based on the embodiments in the present application, all other embodiments obtained by a person skilled in the art without involving any inventive effort are within the scope of the present application.

An embodiment of the present application provides a display panel that may address the problem of light leakage and color mixing in an aperture region of a camera module under a screen and the problem with whitening in a larger viewing angle, and may improve the display effect of the display panel. The display panel may be applied to a terminal, such as a smartphone, a tablet, a notebook, or a personal computer. The display panel is described in detail below. It should be noted that the order in which the following embodiments are described is not intended to limit the preferred order of the embodiments.

Figure 1:
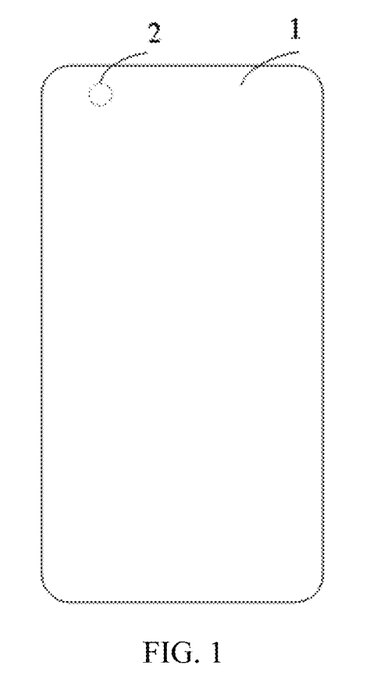
FIG. 1 is a schematic view of a terminal in which a camera module under a screen according to an embodiment of the present application.
Figure 2:
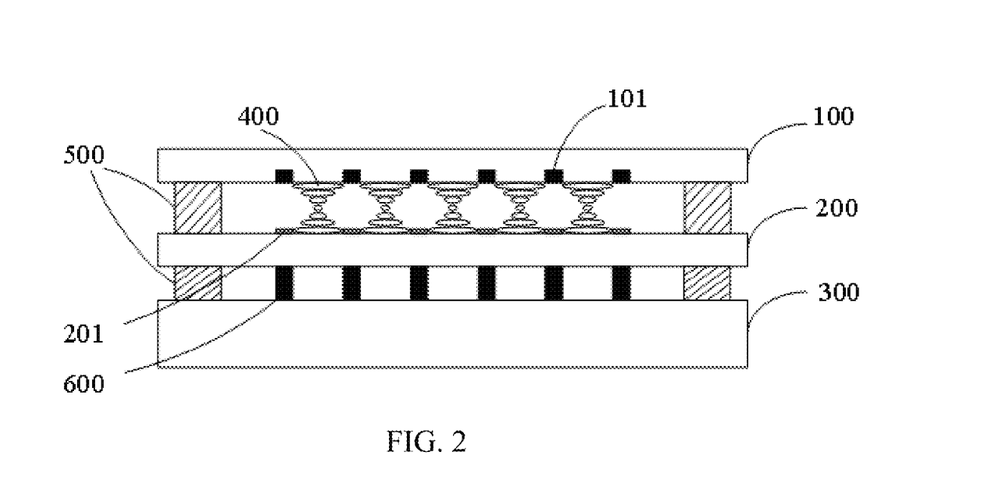
FIG. 2 is a schematic view of a display panel according to an embodiment of the present application.

The present application will now be described in detail with reference to the accompanying drawings and detailed description. With reference to FIGS. 1 and 2, an embodiment of the present application provides a display panel 1, a camera module 2, and a circuit board (not shown). The camera module 2 is disposed below the display panel 1, and the display panel 1 and the camera module 2 are both electrically connected to the circuit board. The circuit board includes a driving circuit mainly configured to drive display of the display panel 1, and a camera circuit mainly configured to control the camera module 2. The circuit board, the display panel 1, and the camera module 2 are electrically connected by one or more conductive members. The display panel 1 includes an array substrate 200, a light blocking matrix, and a backlight module 300. The array substrate 200, the light blocking matrix, and the backlight module 300 are stacked in sequence. The light blocking matrix includes light blocking columns 600 in a grid arrangement.

In an embodiment, the array substrate 200 includes at least a pixel matrix including a plurality of pixel units. A first spacing region is provided between adjacent pixel units and between adjacent sub-pixels in the pixel unit. Pixel isolation walls 201 are provided in the first spacing region. The pixel isolation walls 201 are located at positions facing or corresponding to that of the light blocking column 600. A width of the light blocking column 600 is same as that of the pixel isolation wall 201.

In an embodiment, the pixel isolation wall is configured to isolate individual sub-pixels, and respective sub-pixels are independently controlled through electrodes. The electrode includes a light-opaque material and may include a scanning wiring, a signal wiring, a gate, a source, a drain, or the like, which are generally manufactured by a plurality of photolithographic processes.

In some embodiments, the display panel 1 further includes a color filter substrate 100, and the color filter substrate 100, the array substrate 200, the light blocking matrix, and the backlight module 300 are laminated in sequence.

In some embodiments, the color filter substrate 100 includes at least a light-filtering matrix including a plurality of light-filtering units. Light-filtering isolation columns 101 are provided between adjacent light-filtering units and between adjacent sub-light-filtering units in the light-filtering unit, the light-filtering isolation columns 101 are located at positions facing or corresponding to that of the light blocking columns 600, respectively. The light-filtering isolation column 101, the pixel isolation wall 201, and the light blocking column 600 have the same width.

In some embodiments, the light-filtering matrix may include light-filtering units of primary colors, to form primary colors of light, such as red light, green light, and blue light. The light-filtering isolation column is configured to block light from different light-filtering units, to prevent light mixing and increase the contrast of the displayed picture. The light-filtering isolation column 101 is formed by a metal material such as chromium or a black resin material.

In some embodiments, a liquid crystal layer 400 is disposed between the color filter substrate 100 and the array substrate 200, and the liquid crystal layer 400 may be aligned in response to an electric field, thereby achieving display of a predetermined picture. The color filter substrate 100, the array substrate 200, and the liquid crystal layer 400 form a color-filter on array (COA) liquid crystal cell.

In an embodiment, the array substrate 200 and the backlight module 300 are fixedly connected through a frame sealant 500, and a height of the light blocking matrix is not greater than that of the frame sealant 500. In an embodiment, the height of the light blocking matrix is equal to the height of the frame sealant 500, for example, 50 µm. The frame sealant may be used for fixed connection and light blocking.

In some embodiments, the light blocking matrix includes a light-opaque material, which may be black material.

In an embodiment, the light blocking matrix is configured to limit the angle of light emitted by the backlight module 300, that is, the light blocking matrix may reduce the angle range of the light emitted by the backlight module 300. For example, the light blocking matrix may limit the angle range of the light emitted by the backlight module 300 from a range of 0° to 180° to a range of 30° to 150°.

In view of above, an embodiment of the present application provides a display panel including an array substrate, a light blocking matrix, and a backlight module. The array substrate, the light blocking matrix, and the backlight module are stacked in sequence. The light blocking matrix includes light blocking columns in a grid-like arrangement. The array substrate includes at least a pixel matrix and pixel isolation walls, the pixel matrix includes a plurality of pixel units, a first spacing region is provided between adjacent pixel units and between adjacent sub-pixels in the pixel unit, the pixel isolation walls are provided in the first spacing region, and the pixel isolation walls are located at positions facing or corresponding to that of the light blocking columns, respectively. A width of the light blocking column is same as that of the pixel isolation wall. The display panel may address the problem of light leakage and color mixing in an aperture region of the camera module under the screen and the problem with whitening in a larger viewing angle, and improve the display effect of the display panel.

Another embodiment of the present application provides a method of manufacturing the display panel, which may address the problem of light leakage and color mixing in an aperture region of the camera module under the screen and the problem with whitening in a larger viewing angle, and improve the display effect of the display panel. The display panel may be applied to a terminal, such as a smartphone, a tablet, a notebook, or a personal computer. The method of manufacturing a display panel is described in detail below.

Figure 3:
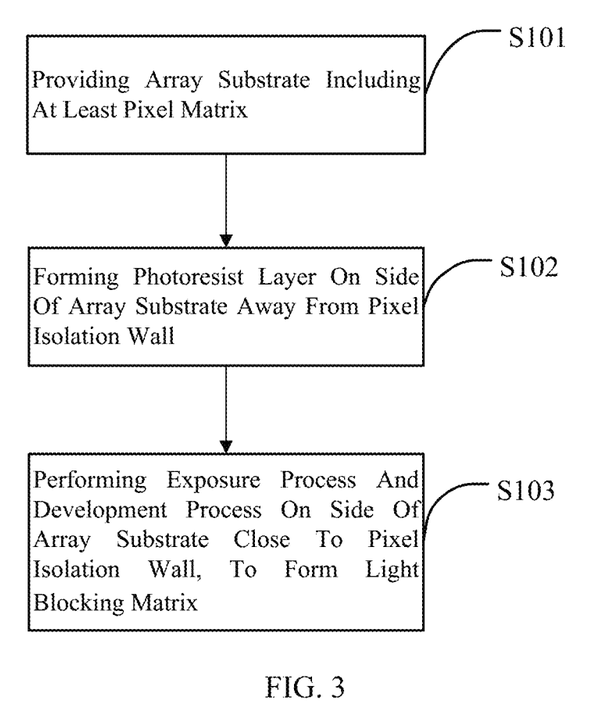
FIG. 3 is a flowchart of a process of manufacturing a display panel according to an embodiment of the present application.

The present application will now be described in detail with reference to the accompanying drawings and detailed description, with reference to FIGS. 3 and 4, the method of manufacturing a display panel may include:

At Step S101, an array substrate may be provided. The array substrate includes at least a pixel matrix and a pixel isolation wall. The pixel matrix includes a plurality of pixel units, and a first spacing region is provided between adjacent pixel units and between adjacent sub-pixels in the pixel unit. The pixel isolation walls are provided in the first spacing region, and include an opaque material.

In an embodiment, the pixel isolation wall is configured to isolate individual sub-pixels, and respective sub-pixels are independently controlled through electrodes. The electrode includes a light-opaque material and may include a scanning wiring, a signal wiring, a gate, a source, a drain, or the like, which are generally manufactured by a plurality of photolithographic processes.

At Step S102, a photoresist layer is formed on a side of the array substrate away from the pixel isolation wall.

Figure 4:
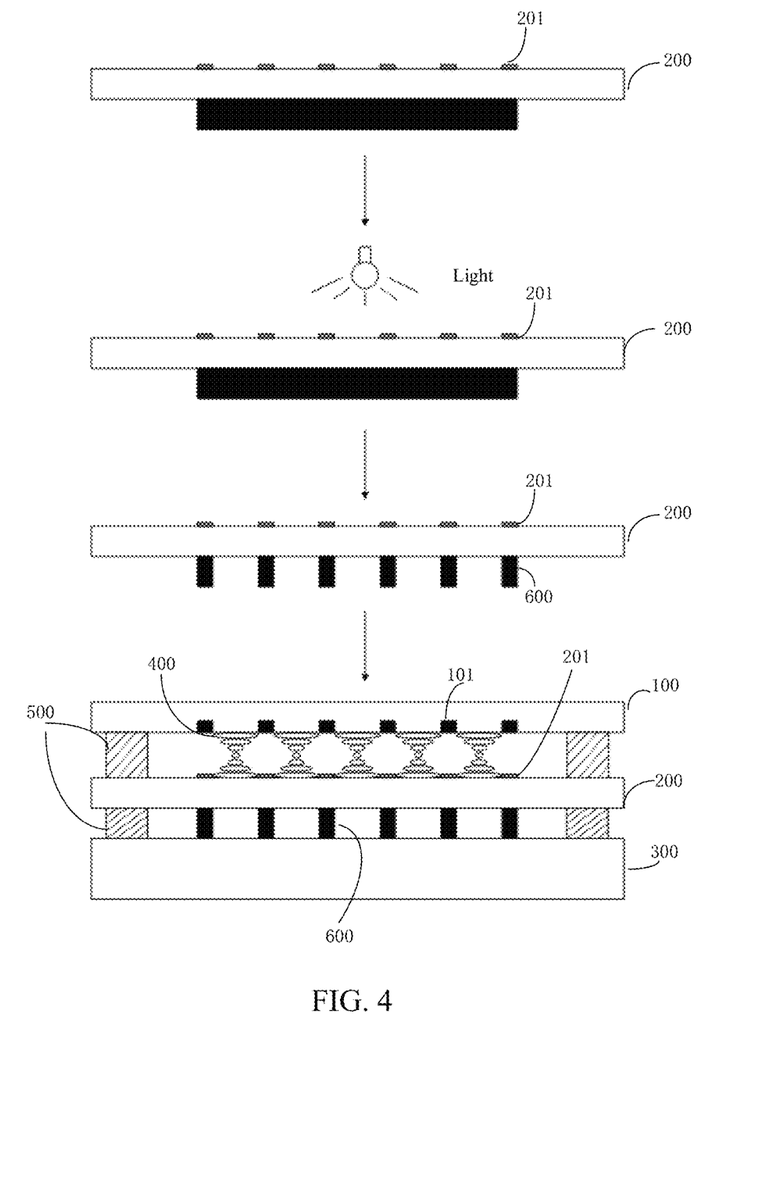
FIG. 4 is a flowchart of a process of manufacturing a display panel according to an embodiment of the present application.

Referring to FIG. 4, the photoresist layer is formed by coating photoresist onto a side of the array substrate 200 away from the pixel isolation wall 201.

In some embodiments, the coating methods may include spin coating or blade coating or the like. The photoresist, also referred to as optical resist, is a light-sensitive organic compound that changes its solubility in the developing solution after absorbing ultraviolet light in an exposure process.

In some embodiments, the photoresist may be black ink-like, positive photoresist.

In some embodiments, a soft baking process may be performed first, to remove a solvent from the photoresist layer, and increase the adhesion of the photoresist to the surface of the array substrate.

At Step S103, an exposure process may be performed on a side of the array substrate close to the pixel isolation wall, and a development process may be performed to form the light blocking matrix.

In an embodiment, referring to FIG. 4, the exposure process may be performed on a side of the array substrate close to the pixel isolation wall of a light-opaque material. Therefore, the pixel isolation wall may be used as a mask for exposure.

In some embodiments, a baking process is further performed on the photoresist layer to eliminate standing wave effects upon exposure and to improve the sidewall profile of the obtained photoresist pattern.

In some embodiments, the development process may be further performed on the photoresist layer.

In an embodiment, the development process may include dripping a developing liquid to the surface of the photoresist layer, and the exposed region of the photoresist layer is dissolved by chemical reaction with the developing liquid.

In some embodiments, a hard baking process may be performed after the development process, so that the light blocking matrix may be formed. The light blocking columns of the light blocking matrix have positions respectively corresponding to that of the pixel isolation walls and each has the same width as that of the pixel isolation.

In some embodiments, the array substrate is coated with the frame sealant, the liquid crystal is dripped on the color filter substrate to form the liquid crystal layer, and each of the array substrate and the color filter substrate is coated with an alignment film. Through a cell process, the array substrate and the color film substrate are connected by the frame sealant to form the LCD cell.

In some embodiments, the backlight module is further bonded to the obtain component by a frame sealant to obtain the liquid crystal display panel.

In some embodiments, in practical applications, the height of the light blocking matrix may be adjusted according to process parameters such as the thickness of the photoresist layer, the type of the photoresist, or the like.

In view of above, an embodiment of the present invention provides a method of manufacturing the display panel. First, an array substrate may be provided. The array substrate includes at least a pixel matrix and a pixel isolation wall. The pixel matrix includes a plurality of pixel units, and a first spacing region is provided between adjacent pixel units and between adjacent sub-pixels in the pixel unit. The pixel isolation walls are provided in the first spacing region, and include an opaque material. A photoresist layer is formed on a side of the array substrate away from the pixel isolation wall. An exposure process may be performed on a side of the array substrate close to the pixel isolation wall, and a development process may be performed to form the light blocking matrix. The display panel may address the problem of light leakage and color mixing in an aperture region of the camera module under the screen and the problem with whitening in a larger viewing angle, and improve the display effect of the display panel.

Another embodiment of the present application provides a method of manufacturing the display panel, which may address the problem of light leakage and color mixing in an aperture region of the camera module under the screen and the problem with whitening in a larger viewing angle, and improve the display effect of the display panel. The display panel may be applied to a terminal, such as a smartphone, a tablet, a notebook, or a personal computer. The method of manufacturing a display panel is described in detail below.

Figure 5:
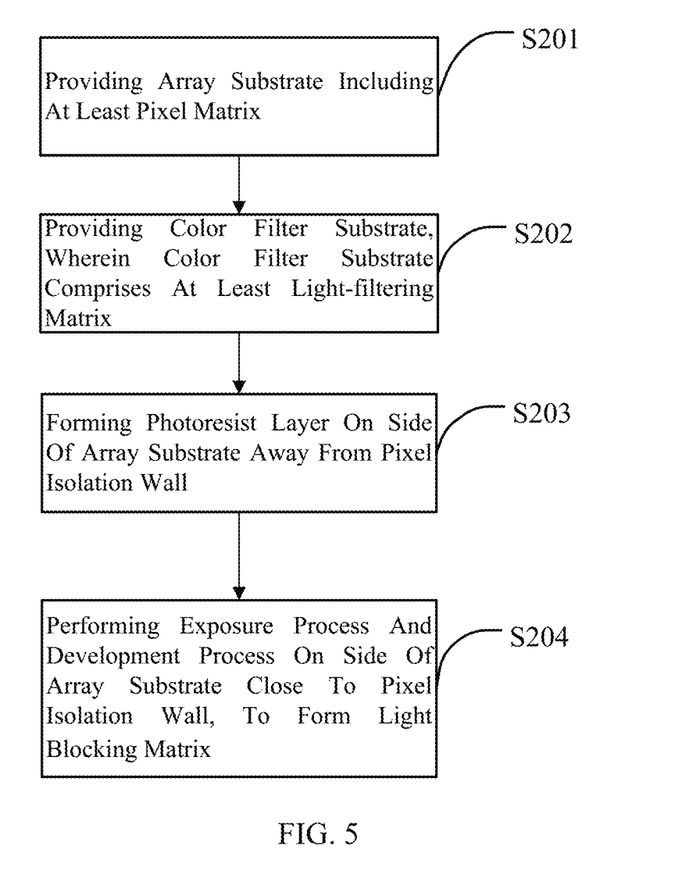
FIG. 5 is a flowchart of a process of manufacturing a display panel according to another embodiment of the present application.

The present application will now be described in detail with reference to the accompanying drawings and detailed description, with reference to FIGS. 5 and 6, the method of manufacturing a display panel may include:

At Step S201, an array substrate may be provided. The array substrate includes at least a pixel matrix and a pixel isolation wall. The pixel matrix includes a plurality of pixel units, and a first spacing region is provided between adjacent pixel units and between adjacent sub-pixels in the pixel unit. The pixel isolation walls are provided in the first spacing region, and include an opaque material.

In an embodiment, the pixel isolation wall is configured to isolate individual sub-pixels, and respective sub-pixels are independently controlled through electrodes. The electrode includes a light-opaque material and may include a scanning wiring, a signal wiring, a gate, a source, a drain, or the like, which are generally manufactured by a plurality of photolithographic processes.

At Step S202, a color filter substrate may be provided. The color filter substrate includes at least a light-filtering matrix including a plurality of light-filtering units. A second spacing region is provided between adjacent light-filtering units and between adjacent sub-light-filtering units in the light-filtering unit. Light-filtering isolation columns are provided in the second spacing region, and include an opaque material.

In an embodiment, the color filter substrate, the pixel isolation wall, and the array substrate are stacked in sequence.

In some embodiments, the array substrate is coated with the frame sealant, the liquid crystal is dripped on the color filter substrate to form the liquid crystal layer, and each of the array substrate and the color filter substrate is coated with an alignment film. Through a cell process, the array substrate and the color film substrate are aligned and connected by the frame sealant to form the LCD cell.

In some embodiments, the color filter substrate includes at least a light-filtering matrix including a plurality of light-filtering units. A light-filtering isolation column is provided between adjacent light-filtering units and between adjacent sub-light-filtering units in the light-filtering unit. The color of the light-filtering matrix may include primary colors, so that primary colors of light is formed, such as red light, green light, and blue light. The light-filtering isolation column is configured to block light from different light-filtering units, to prevent light mixing and increase the contrast of the displayed picture. The light-filtering isolation column is formed by a metal material such as chromium or a black resin material. Therefore, the light-filtering isolation column may be used as a mask plate for exposure. The width of the light-filtering isolation column is same as the width of the pixel isolation wall. The positions of the light blocking column, the pixel isolation wall, and the light-filtering isolation column of the light blocking matrix correspond to each other, and the light blocking column, the pixel isolation wall, and the light-filtering isolation column of the light blocking matrix have the same width.

At Step S203, a photoresist layer may be formed on a side of the array substrate away from the pixel isolation wall.

Figure 6:
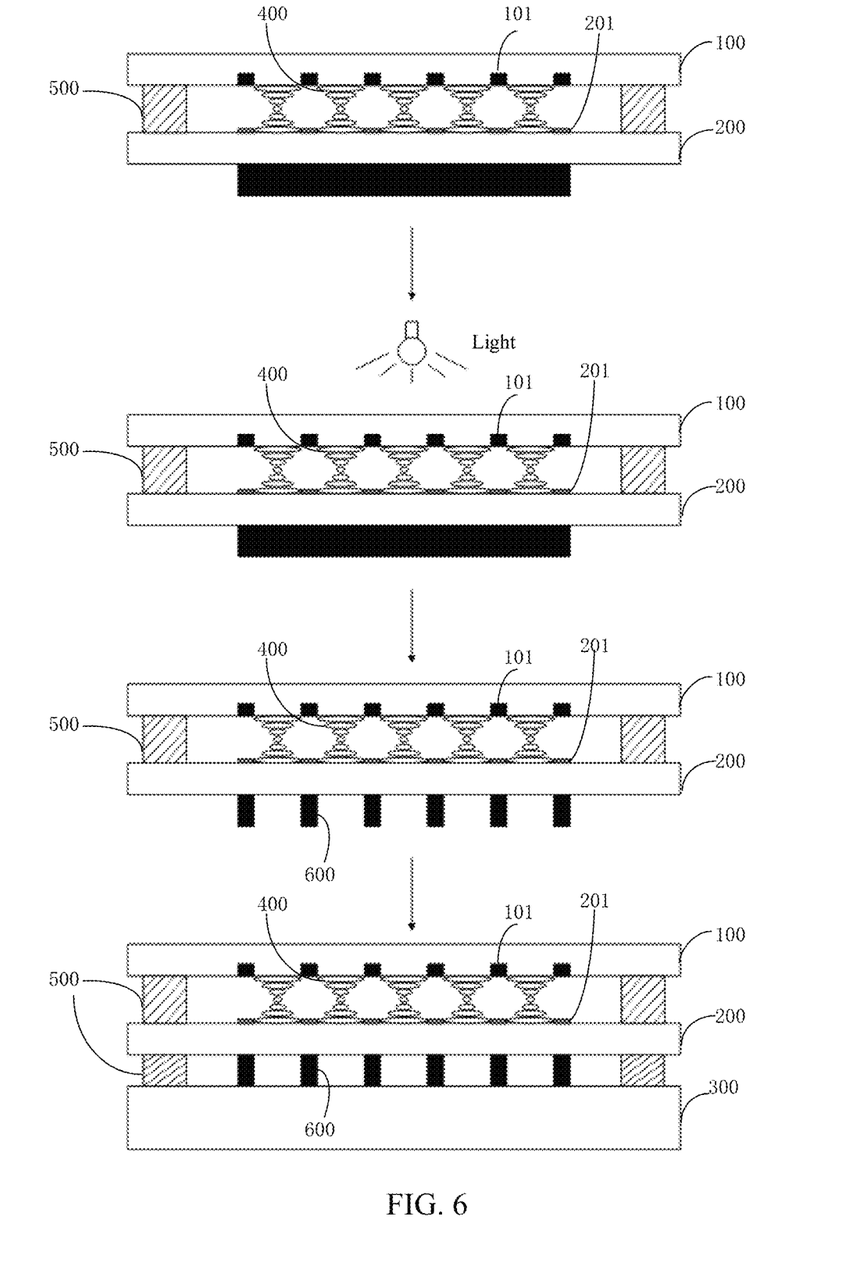
FIG. 6 is a flowchart of a process of manufacturing a display panel according to another embodiment of the present application.

In an embodiment, referring to FIG. 6, the photoresist layer is formed by coating photoresist onto a side of the array substrate 200 away from the pixel isolation wall 201.

In some embodiments, the coating methods may include spin coating, blade coating, or the like. The photoresist, also referred to as optical resist, is a light-sensitive organic compound that changes its solubility in the developing solution after absorbing ultraviolet light in an exposure process.

In some embodiments, the photoresist may be black ink-like, positive photoresist.

At Step S204, an exposure process is performed on a side of the color filter substrate away from the pixel isolation wall, and a development process may be performed to form the light blocking matrix.

In an embodiment, referring to FIG. 6, an exposure process is performed on a side of the color filter substrate away from the pixel isolation wall.

In some embodiments, a soft baking process may be performed first, to remove a solvent from the photoresist layer, and increase the adhesion of the photoresist layer to the surface of the array substrate.

In some embodiments, the development process may be further performed on the photoresist layer.

In an embodiment, the development process may include dripping a developing liquid to the surface of the photoresist layer, and the exposed region of the photoresist layer is dissolved by chemical reaction with the developing liquid.

In some embodiments, the dissolved photoresist is removed by deionized water and a cleaning and drying process is performed;

In some embodiments, a hard baking process may be performed after the development process, so that the light blocking matrix may be formed. The light blocking columns of the light blocking matrix have positions respectively corresponding to that of the pixel isolation walls and each has the same width as that of the pixel isolation.

In some embodiments, the backlight module is further bonded to the obtain component by a frame sealant to obtain the liquid crystal display panel.

In view of above, another embodiment of the present application provides a method of manufacturing the display panel. An array substrate is provided. A color filter substrate is provided. The color filter substrate, the pixel isolation wall, and the array substrate are stacked in sequence. A photoresist layer is formed on a side of the array substrate away from the pixel isolation wall. An exposure process is performed on a side of the color filter substrate away from the pixel isolation wall, and a development process may be performed to form the light blocking matrix. The display panel may address the problem of light leakage and color mixing in an aperture region of the camera module under the screen and the problem with whitening in a larger viewing angle, and improve the display effect of the display panel.

Figure 7:
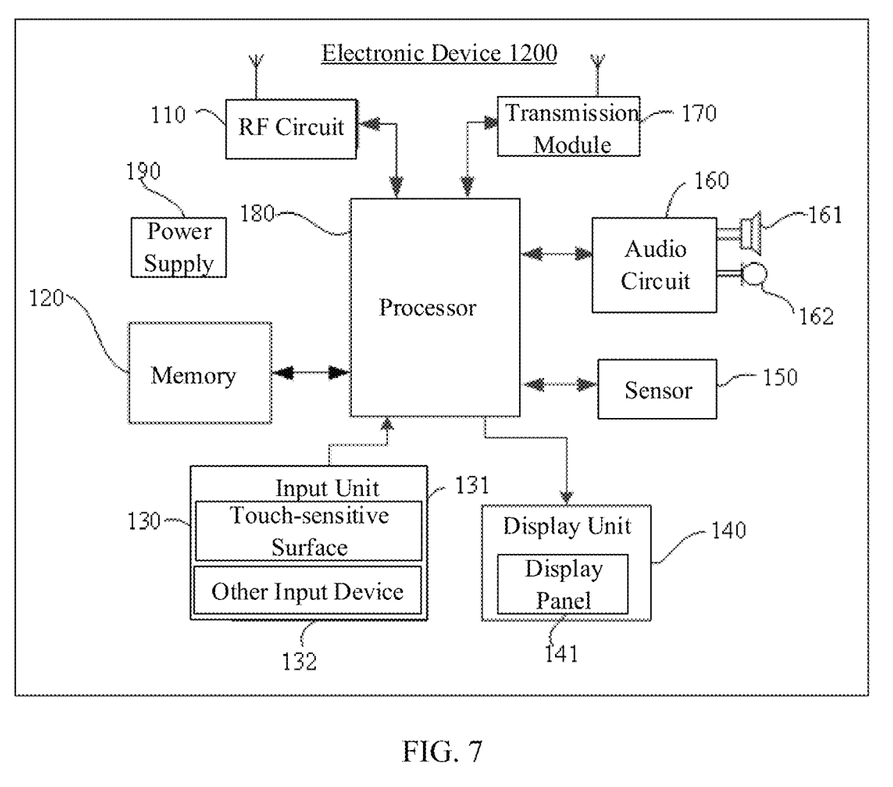
FIG. 7 is a schematic block diagram of an electronic device according to an embodiment of the present application.

The foregoing describes a display panel according to an embodiment of the present application. An electronic device according to an embodiment of the present application is described below from the perspective of hardware processing. An embodiment of the present application further provides an electronic device, as shown in FIG. 7, which shows a schematic block diagram of the electronic device according to the embodiment of the present application. The electronic device may be a mobile phone, a computer, a digital broadcast terminal, a message transceiver device, a game console, a tablet device, a medical device, an exercise device, a personal digital assistant, or the like.

The electronic device 1200 may include components such as a radio frequency (RF) circuit 110, a memory 120 including one or more (only one shown in the figure) computer readable storage media, an input unit 130, a display unit 140, a sensor 150, an audio circuit 160, a transmission module 170, a processor 180 including one or more (only one shown in the figure) processing cores, or a power supply 190. It will be appreciated by those skilled in the art that the structure of the electronic device 1200 shown in FIG. 7 is not intended to limit the electronic device according to the embodiments of the present application, and may include more or less components than illustrated, or may combine certain components, or may have different component arrangements.

The RF circuit 110 is configured to receive and transmit an electromagnetic wave, to realize the mutual conversion of the electromagnetic wave and an electric signal, so as to communicate with a communication network or other equipment. The RF circuit 110 may include various existing circuit elements for performing these functions, such as an antenna, a radio frequency transceiver, a digital signal processor, an encryption/decryption chip, a subscriber identity module (SIM) card, a memory, or the like. The RF circuit 110 may communicate with various networks, such as an internet, an enterprise intranet, a wireless network, or with other devices through the wireless network.

The memory 120 may be used to store software programs and modules, such as program instructions/modules corresponding to the control method in the above-described embodiments. The processor 180 executes various functional applications and data processing by running the software programs and modules stored in the memory 120. The memory 120 may include high speed random access memory, and may also include non-volatile memory, such as one or more magnetic storage devices, flash memory, or other non-volatile solid state memory. In some examples, the memory 120 may further include a memory disposed remotely relative to the processor 180, which may be connected to the electronic device 1200 via a network. Examples of such networks include, but are not limited to, the internet, the enterprise intranet, local area networks, mobile communication networks, or combinations thereof.

The input unit 130 is configured to receive input numeric or character information and generate keyboard, mouse, joystick, or optical or trackball signal inputs in relation to user settings and functional control. In an embodiment, the input unit 130 may include a touch-sensitive surface 131 and other input devices 132. The touch-sensitive surface 131, also referred to as a touch display screen or a touch pad, may collect a touch operation of a user thereon or in the vicinity of the touch-sensitive surface 131 (such as an operation of the user on or in the vicinity of the touch-sensitive surface 131 by using any suitable object such as a finger, a stylus, or the like, or accessory), and actuate a corresponding connection apparatus according to a preset program. In addition to the touch-sensitive surface 131, the input unit 130 may also include other input devices 132. In an embodiment, other input devices 132 may include, but are not limited to, one or more of a physical keyboard, a function key (such as a volume control key, an on-off key, etc.), a trackball, a mouse, a joystick, or the like.

The display unit 140 may be configured to display information input by or provided to the user and various graphical user interfaces of the electronic device 1200. The graphical user interfaces may be composed of graphics, text, icons, videos, or any combination thereof. The display unit 140 may include a display panel 141. Further, the touch-sensitive surface 131 may cover the display panel 141. When the touch-sensitive surface 131 detects a touch operation on or in the vicinity of the touch-sensitive surface 131, the touch-sensitive surface transmits a signal to the processor 180 to determine a type of a touch event, and then the processor 180 provides a visual output on the display panel 141 according to the type of the touch event. The display unit 140 is the screen according to one of the above-described embodiments.

The electronic device 1200 may further include at least one sensor 150, such as a light sensor, a motion sensor, and other sensors. Other sensors, such as a barometer, a hygrometer, a thermometer, an infrared sensor, or the like, which may be configured in the electronic device 1200, are not described herein.

An audio circuit 160, a speaker 161, a microphone 162 may provide an audio interface between a user and electronic device 1200. The audio circuit 160 may transmit an electrical signal converted from the received audio data to the loudspeaker 161, and convert the electrical signal into a sound signal by the loudspeaker 161 for outputting. On the other hand, the microphone 162 converts the collected sound signal into an electrical signal, the electrical signal is received by the audio circuit 160 and converted into audio data, the audio data is then output and processed by the processor 180, and then transmitted to, for example, another terminal via the RF circuit 110, or the audio data is output to the memory 120 for further processing. The audio circuit 160 may also include an earplug jack to provide communication between the peripheral headset and the electronic device 1200.

The electronic device 1200 may assist a user in receiving and transmitting e-mail, browsing web pages, accessing streaming media, or the like, via a transmission module 170, such as a Wi-Fi module. The electronic device 1200 provides the user with wireless broadband Internet access. Although the transmission module 170 is shown in FIG. 7, it will be appreciated that it does not belong to the necessary constitution of the electronic device 1200, and may be omitted as necessary without changing the essence of the present application.

The processor 180 is a control center of the electronic device 1200, connects various parts of the entire cellphone by various interfaces and lines, executes various functions and processes data of the electronic device 1200 by running or executing software programs and/or modules stored in the memory 120, and invoking data stored in the memory 120, thereby performing overall monitoring on the cellphone. Alternatively, the processor 180 may include one or more processing cores. In some embodiments, the processor 180 may integrate an application processor and a modem processor. The application processor primarily processes an operating system, a user interface, an application program, or the like. The modem processor primarily processes wireless communications. It will be appreciated that the modem processor may not be integrated into the processor 180.

The electronic device 1200 further includes a power supply 190 (such as a battery) that supplies power to the various components. In an embodiment, the power supply may be logically connected to the processor 180 through a power management system to perform functions such as managing charging or discharging, or power consumption management through the power management system. The power supply 190 may further include one or more DC or AC power supplies, a recharging system, a power failure detection circuit, a power converter or inverter, a power status indicator, or any other component.

Although not shown, the electronic device 1200 may also include a camera (e.g., a front-facing camera, a rear-facing camera), a Bluetooth module, or the like, and details are not described herein. In an embodiment, the display unit 140 of the electronic device 1200 is a touch screen display, and the electronic device 1200 further includes a memory 120, and one or more programs. The one or more programs are stored in the memory 120 and configured to execute the programs stored in the memory 120 by the one or more processors 180, thereby implementing various functions.

In the above-mentioned embodiments, the description of each embodiment has its own emphasis, and parts not described in detail in a certain embodiment may be referred to the related description of other embodiments.

An electronic device according to an embodiment of the present invention has been described in detail. A specific example is used to illustrate the principles and implementations of the present application. The description of the above embodiments is merely provided to help understand the technical solution and the core idea of the present application. It will be appreciated by those of ordinary skill in the art that modifications may be made to the technical solutions described in the foregoing embodiments, or substitutions may be made to some of the technical features therein. These modifications or substitutions fall into the scope of the technical solutions of the embodiments of the present application.

What is claimed is:

1. A display panel comprises an array substrate, a light blocking matrix, and a backlight module, wherein the array substrate, the light blocking matrix, and the backlight module are stacked in sequence, and the light blocking matrix comprises light blocking columns in a grid arrangement, wherein the array substrate comprises at least a pixel matrix, the pixel matrix comprises a plurality of pixel units, a first spacing region is provided between adjacent ones of the plurality of pixel units and between adjacent sub-pixels in each of the plurality of pixel units, pixel isolation walls are provided in the first spacing region, and the pixel isolation walls are located at positions corresponding to that of the light blocking columns, respectively.

2. The display panel of claim 1, wherein a width of the light blocking column is same as that of the pixel isolation wall.

3. The display panel of claim 1, further comprising: a color filter substrate, wherein the color filter substrate, the array substrate, the light blocking matrix, and the backlight module are laminated in sequence, and wherein the color filter substrate comprises at least a light-filtering matrix comprising a plurality of light-filtering units, a second spacing region is provided between adjacent ones of the plurality of light-filtering units and between adjacent sub-light-filtering units in each of the plurality of light-filtering units, light-filtering isolation columns are provided in the second spacing region, and the light-filtering isolation columns are located at positions corresponding to that of the light blocking columns.

4. The display panel of claim 3, wherein the light-filtering isolation column, the pixel isolation wall, and the light blocking column have the same width.

5. The display panel of claim 1, wherein the array substrate and the backlight module are fixedly connected through a frame sealant, and a height of the light blocking matrix is lesser than or equal to that of the frame sealant.

6. The display panel of claim 1, wherein the light blocking matrix is a black light blocking matrix.

7. An electronic device, wherein the electronic device comprises a display panel, a camera module, and a circuit board, the camera module is disposed below the display panel, and both the display panel and the camera module are electrically connected to the circuit board; and wherein the display panel comprises an array substrate, a light blocking matrix, and a backlight module, the array substrate, the light blocking matrix, and the backlight module are stacked in sequence, and the light blocking matrix comprises light blocking columns arranged in a grid arrangement, wherein the array substrate comprises at least a pixel matrix, the pixel matrix comprises a plurality of pixel units, a first spacing region is provided between adjacent ones of the plurality of pixel units and between adjacent sub-pixels in each of the plurality of pixel units, pixel isolation walls are provided in the first spacing region, and the pixel isolation walls are located at positions corresponding to that of the light blocking columns, respectively.

8. The electronic device of claim 7, wherein a width of the light blocking column is same as that of the pixel isolation wall.

9. The electronic device of claim 7, further comprising: a color filter substrate, wherein the color filter substrate, the array substrate, the light blocking matrix, and the backlight module are laminated in sequence, and wherein the color filter substrate comprises at least a light-filtering matrix comprising a plurality of light-filtering units, a second spacing region is provided between adjacent ones of the plurality of light-filtering units and between adjacent sub-light-filtering units in each of the plurality of light-filtering units, light-filtering isolation columns are provided in the second spacing region, and the light-filtering isolation columns are located at positions corresponding to that of the light blocking columns.

10. The electronic device of claim 9, wherein the light-filtering isolation column, the pixel isolation wall, and the light blocking column have the same width.

11. The electronic device of claim 7, wherein the array substrate and the backlight module are fixedly connected through a frame sealant, and a height of the light blocking matrix is lesser than or equal to that of the frame sealant.

12. The electronic device of claim 7, wherein the light blocking matrix is a black light blocking matrix.

* * * * *